United States Patent [19]

Dawans et al.

[11] 4,255,524
[45] Mar. 10, 1981

[54] SYNTACTIC FOAM COMPOSITIONS USEFUL FOR MANUFACTURING FLOATING ARTICLES

[75] Inventors: François Dawans, Bougival; Daniel Binet, Rueil Malmaison, both of France

[73] Assignee: Institut Francais du Petrole, Rueil-Malmaison, France

[21] Appl. No.: 85,366

[22] Filed: Oct. 16, 1979

[30] Foreign Application Priority Data

Oct. 16, 1978 [FR] France .................. 78 29610

[51] Int. Cl.³ .................................................. C08J 9/32
[52] U.S. Cl. ................................... 521/54; 260/42.18; 260/42.37; 260/42.47; 521/139; 521/140; 525/193; 525/236; 525/315; 525/316
[58] Field of Search .............. 521/54, 140; 260/42.18, 260/42.31, 42.47

[56] References Cited

U.S. PATENT DOCUMENTS

| 3,219,600 | 11/1965 | Rucker | 521/54 |
| 3,238,156 | 3/1966 | Kohrn | 521/54 |
| 3,373,123 | 3/1968 | Brice | 521/54 |
| 3,856,721 | 12/1974 | Fritschel | 521/54 |
| 3,864,181 | 2/1975 | Wolinski et al. | 521/54 |
| 4,107,134 | 8/1978 | Dawans | 521/54 |
| 4,108,806 | 8/1978 | Cohrs et al. | 521/54 |

FOREIGN PATENT DOCUMENTS

| 1535144 | 6/1968 | France . |
| 2361438 | 12/1978 | France . |
| 1195568 | 6/1970 | United Kingdom . |
| 1541203 | 2/1979 | United Kingdom . |

Primary Examiner—Morton Foelak
Attorney, Agent, or Firm—Millen & White

[57] ABSTRACT

Syntactic foam compositions are manufactured by heat-curing, in the presence of a free radical generator, a mixture comprising a resin and hollow spheres; the resin consists of (a) 10 to 100% of polybutadiene with 20-95% 1,2 units, 5-60% thereof being in a carbocyclic cyclized form, its number average molecular weight being at most 100,000;

(b) 0 to 90% of polybutadiene with 40-98% 1, 2 units and 2-60% 1, 4 units, its number average molecular weight being at most 100,000; and (c) 0 to 90% of a polymerizable liquid vinyl monomer.

11 Claims, No Drawings

SYNTACTIC FOAM COMPOSITIONS USEFUL FOR MANUFACTURING FLOATING ARTICLES

BACKGROUND OF THE INVENTION

The present invention relates to improved low density resin compositions and to their manufacture.

The various marine and sub-marine techniques are known to have recourse to materials having particular properties, particularly a low density, a high resistance to hydrostatic pressure, a high resistance to hydrolysis and a low absorption capacity for water under pressure.

The prior art has proposed, under the generic name of "syntactic foams", a number of materials consisting essentially of a charge of hollow spheres distributed within a resin matrix, according to the ASTM definition.

As a rule, the charge of hollow spheres to be introduced into the syntactic foams may be of inorganic or organic nature; microspheres of borosilicate glass or silica of usual diameter from 10 to 200 microns are widely used. The density of the foam may be further decreased by adding macrospheres of glass or of thermoplastic or thermosetted resins, optionally reinforced with fibers, their diameter being, for example, from 2 to 50 mm; however such a macrosphere addition is often detrimental to the compressive strength.

Widely used resins for manufacturing syntactic foams of the prior art are thermosetting resins, such as polyepoxides or polyesters, whose density is higher than 1.1 g/cm$^3$.

The use of thermosetting resin compositions based on polybutadiene optionally diluted with a monomer polymerizable in the presence of free radical has also been disclosed in the prior art; it has the advantage of using a resin of density close to 0.9 g/cm$^3$. The process disclosed in U.S. Pat. No. 3,856,721 has thus recourse to 1,3-butadiene homopolymers or copolymers of the latter with a styrene compound; they are defined as containing at least 40% by weight of butadiene, at least 80% thereof being butadiene units of the 1,2 type.

Other compositions of syntactic foams based on polybutadiene have also been disclosed by the applicant, for example, in French Pat. No. 2,346,403, corresponding to U.S. Pat. No. 4,107,134; these compositions are defined as obtained from polybutadienes with 50 to 80% of 1,2-units; these polymers may be optionally partially epoxidized or silanized, to thereby improve the sticking of the resin on the glass spheres; the resin may be optionally reinforced by further addition of a fiber charge.

French Pat. No. 2,361,438 discloses using a resin based on at least one non-functional polybutadiene of very high 1,2-units content and a bi- or poly-functional polybutadiene of lower 1,2-units content, together with a polyfunctional organic compound to lengthen the chains of the functional polymer by polycondensation, the whole being optionally diluted with a vinyl monomer to be polymerized in the presence of free radicals.

The latter compositions, based on polybutadiene resins, according to the prior art, had the advantage of a better control when curing the syntactic foam, particularly by reducing the exotherm in the foam. This problem is particularly critical when manufacturing articles of large size and section from syntactic foam, such as certain marine floats.

SUMMARY OF THE INVENTION

It has now been found that the curing of the syntactic foams based on polybutadiene can be more easily and more accurately controlled, and their resistance to hydrostatic compression can be improved, by using a resin comprising polybutadiene having a high content of partially cyclized 1,2-units.

DETAILED DISCUSSION

As a rule, the improved compositions of syntactic foam according to the invention result from the thermosetting of a mixture of inorganic or organic hollow spheres of appropriate size with a resin consisting at least in part (at least 10% by weight) of polybutadiene containing at least 20% of 1,2-addition units, of which at least 5%, with respect to the total number of the butadiene units, are in the cyclized form, said thermosetting being conducted in the presence of at least one free radical generator.

More specifically, the resins to be introduced into the compositions of syntactic foam according to the invention, comprise:

(a) from 10 to 100%, preferably from 10 to 60%, by weight, of one or more polybutadienes whose microstructure comprises 20 to 95%, preferably 40 to 85%, of 1,2 units, from which 5 to 60%, preferably 15 to 45%, with respect to the total number of the butadiene units, are in the cyclized form, the unsaturation remainder being at will of the cis or trans 1,4-type;

(b) from 0 to 90%, preferably 15 to 70%, by weight of one or more polybutadienes whose microstructure comprises 40 to 98%, preferably 65 to 80%, of 1,2 units and 2 to 60%, preferably 20 to 35%, of cis or trans 1,4 units, the by number average molecular weight of the polybutadienes (a) and (b) being at most about 100,000 and preferably about 500 to 30,000; and (c) 0 to 90%, preferably 20 to 60%, by weight of one or more liquid vinyl monomers which can polymerize in the presence of free radicals.

One or more free radical generators are added to the so-constituted resin, in proportion ranging, for example, from 0.2 to 5%, preferably from 0.5 to 3%, by weight, with respect to the resin weight.

Polybutadienes of high 1,2-unit content and low molecular weight are well known in the art; they can be prepared according to conventional techniques, either by anionic catalysis, for example in the presence of an alkali metal compound and optionally a polar compound, such as an ether or an amine, or by coordination catalysis, for example in the presence of catalytic systems based on molybdenum or chromium.

Partially cyclized 1,2 polybutadienes are also well known in the art. They are described, for example, in the book "High Polymers", vol. 29: Chemical Reactions of Polymers, Interscience Publishers (1964), page 90. They can be prepared either by intramolecular cyclization of the above polymers, effected, for example, by treatment with a Lewis acid or a Broensted acid, or by direct anionic polymerization of 1,3-butadiene in the presence of an organolithium or organosodium compound chelated with a polyamine, such as, for example, N,N,N',N'-tetramethyl ethylene diamine of the formula (CH$_3$)$_2$ N CH$_2$ CH$_2$ N (CH$_3$)$_2$.

The cyclization rate of these polybutadienes may be measured by the extent of the disappearance of vinyl units, when treating 1,2 polybutadiene by means of an acid. Its determination may also be effected by Infra-red or Nuclear Magnetic Resonance methods. The carbocyclic cyclized 1,2 units appear quite probably as sequences of the following structure:

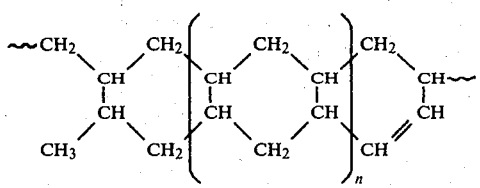

(where n is an integer).

The amount, type and size of the hollow spheres present in the compositions of syntactic foam, according to the invention, are determined in accordance with the qualities desired for the syntactic foam. From 10 to 50 parts by weight of hollow spheres is generally used for 100 parts by weight of foam. However, when syntactic foams having a density of about 0.5 g/cm$^3$ and a sufficient compressive strength are desired, there is preferably used 25 to 32 parts by weight of glass microspheres for 100 parts by weight of foam; microspheres with thick glass walls and small size (for example a diameter from 10 to 250 microns) will be preferred. On the other hand, when it is important to lower the density of the foam, the compressive strength being not critical, 20 to 40 parts by weight of macrospheres (of diameter from, for example, 1 to 20 mm) can be added. Finally, in order to obtain a low density and/or a better packing of the spheres (filling factor), it may be advantageous to use a mixture of macro- and micro-spheres, or a mixture of microspheres whose diameter distribution is binodal.

The hollow spheres may be incorporated directly to the polybutadiene(s) when the latter is (are) liquid, for example when its (their) number average molecular weight is lower than 5,000. But generally the hollow spheres are added to a solution of the polybutadiene(s) in one or more vinyl monomers, liquid at room temperature and subsequently polymerizable and/or graftable in the presence of free radicals.

The vinyl monomers which can be polymerized in the presence of free radicals may be used as such or as mixtures; they are also well known in the art. Monomers of low volatility, liquid at 40° C. (to facilitate the processing of the resins) and consisting entirely of hydrocarbons (to confer to the resins a high resistance to hydrolysis) are preferred; examples of such monomers are styrene, ethylstyrene, α-methyl styrene, tert. butylstyrene and vinyl toluene.

The vinyl monomer content of the resin is variable; it depends particularly on the viscosity of the polybutadiene(s) solution to which the hollow spheres are incorporated. As mentioned above, the vinyl monomer may amount up to 90% and is preferably from 20 to 60% by weight of the resin.

According to a particularly advantageous embodiment of the invention, the glass microspheres are caused to float in the vinyl monomer(s) before admixture with the other ingredients of the resin, which facilitates the separation by decantation of the broken or perforated glass microspheres and finally yields foam of minimum density and high resistance to hydrostatic pressure.

The cross-linking rate of the resin may also be increased by adding to these monomers, polyvinyl comonomers such as, for example, divinylbenzene, trisallyl cyanurate or trimethylolpropane trimethacrylate.

The addition of comonomers which improve the adhesion of the resin to the hollow spheres is also advantageously contemplated: there is used, for example, vinyltriethoxysilane, vinylsilane, vinyl tris (2-methoxyethoxy) silane or γ-methacryloxypropyltrimethoxy silane.

Finally, without departing from the invention, various other conventional additives may be added to the resins before curing it, for example, stabilizing agents, fireproofing agents and reinforcing or heat-conducting charges. In this respect, the addition of small amounts of carbon fibers, as disclosed by the applicant in French Pat. No. 2,346,403 is particularly advantageous, since this charge of low density acts both as a reinforcing and a heat-conducting agent, so that the heat evolved when curing the resin can be more easily removed.

The free radical generator to be used in the compositions according to the invention is preferably an organic perester or peroxide compound; examples thereof are di-tert.butyl peroxide, benzoyl peroxide, lauroyl peroxide, tert.butyl peracetate, di-cumyl peroxide, 2,5-dimethyl-2,5-bis(perbenzoyloxy)hexane, methylethyl ketone peroxide, 2,5-dimethyl-2,5-di(tert-butyl peroxy) hexane, di-tert.butyl diperoxyphthalate, tert.butyl perbenzoate, di-(4-tert.butyl cyclohexyl) peroxydicarbonate, tert.butyl peroxyisobutyrate, tert.butyl peroctoate, dicyclohexyl peroxydicarbonate, 2,4-dichloro benzoyl peroxide, caproyl peroxide, acetyl peroxide, p-chlorobenzoyl peroxide, hydroxyheptyl peroxide, cyclohexanone peroxide and tert.butyl hydroperoxide.

Average concentrations of free radical generators range from 0.2 to 5 parts by weight per 100 parts of resin, these values being not limitative. These concentrations depend particularly on the size of the foam article to be cross-linked; for example, as concerns large size articles, it is preferred to use 0.5 to 3 parts of free radical generator, while higher concentrations are used for articles of small size, for example, up to 5 parts by weight per 100 parts by weight of resin.

Mixtures of free radical generators and their mixtures with resin setting activators are also in the scope of the invention. Examples of these activators, well known in the art, are cobalt naphthenate, iron naphthenate, nickel octoate or cobalt acetylacetonate, or a mixture of these compounds, optionally with an accelerator such as acetylacetone.

The curing temperature and time of the syntactic foams according to the invention are variable; they depend particularly on the type of free radical generator to be used and the resin composition. As a rule, curing is effected by heating the mixture at a temperature from 25° to 200° C. for 1 to 60 hours.

Whenever desired, the resin can be cured in two steps, to better control the reaction. This embodiment is adapted to the curing of foam articles of large section or large size. In the first stage, curing is effected at a temperature from about 30° to 105° C., for example 45° to 105° C., in the presence of a suitable free radical generator such as an organic peroxy compound having a 10-hour half-decomposition temperature of at most 105° C. It is however advantageous to select an initiator system which is not active at room temperature; as a matter of fact, the processing of the foam and its degassing before curing is more easily conducted at a temperature from 30° to 50° C., since the fluidity of the mixture is improved at these temperatures. Examples of peroxy compounds convenient for this step are benzoyl peroxide and lauroyl peroxide. Another useful mixture is made of peroxide, cobalt and iron naphthenates and acetylacetone, for example a mixture of methylethylketone peroxide, cobalt naphthenate, iron naphthenate and acetylacetone.

The second stage of the curing is effected in the presence of a peroxy compound which decomposes at a temperature higher than that used in the first step; it is usually effected at a temperature from about 80° to 180° C., commonly 120° to 160° C. An organic peroxy compound having a 10-hour half-decomposition temperature of at least 115° C. is commonly used. Examples of such compounds are: dicumyl peroxide, tert.butyl perbenzoate and di-tert.butyl peroxide.

On the other hand, if the heat evolved during the first step of the curing is insufficient to decompose the peroxide used in the second stage, curing is completed by heating the foam up to the required temperature, for example, in an oven.

To illustrate a composition comprising radical initiators and a curing cycle adapted to the manufacture of finished articles of large section, 1 to 2 parts by weight of benzoyl or lauroyl peroxide and 1 to 2 parts by weight of dicumyl peroxide are added to 100 parts by weight of resin and the resultant mixture with the hollow spheres is heated in a mould at a temperature from 55° to 70° C. during about 20 hours, then the temperature is raised progressively to 130° C., the temperature increasing, for example, by 10° C. per hour. The temperature of the oven is maintained at 130° C. for about 24 hours, before stepwise cooling of the foam to room temperature. This preferred embodiment avoids the formation of air-holes or micro-cracks in the finished article.

When compared to the syntactic foams of the prior art, based on epoxy or polyester resins, the foams according to the invention advantageously make use of a resin which has a better resistance to hydrolysis and a lower specific weight. It is thus possible to manufacture foams of a density of the order of 0.4 to 0.5 g/cm$^3$ without addition of expensive macrospheres, which cannot be processed easily and are liable to break when compressing the foams.

When compared to the syntactic foams of the prior art, based on uncyclized polybutadiene resins, the foams conforming to the invention have the following advantages:

a better control of the exotherm when heat-curing the resin, which avoids thermal stresses, air-holes and cracks in the finished article;

a lower shrinkage of the finished thermo-set resin;

an increased resistance to water pressure, since the presence of cyclized sequences in the polybutadiene chains improve the compression modulus.

The following examples illustrate the invention. They are not to be considered as limitative in any respect. Example 1 is given for comparison purpose.

EXAMPLES 1 TO 9

The properties of the polybutadienes involved in examples 1 to 9 are given in Table 1.

The compositions of the foams are given in Table 2. The hollow glass microspheres are sold by Minnesota Mining and Manufacturing Company under the reference B 28-750; they have a diameter from 20 to 200 microns. The same microspheres have been used in example 7, except that they were previously sorted by flotation in vinyltoluene.

The glass microspheres are added to the mixture of the polybutadiene(s) with the other optional ingredients of the resin; the whole is stirred at about 25°–35° C. for 30 minutes, and then degassed under reduced pressure before being poured into the curing mould.

Curing of the foam is effected in a (optionally ventilated) heat-controlled oven, and the temperature in the heart of the foam is followed by means of a heat sensor. The heat-curing conditions of the foam and the properties of the thermo-set foams are given in the Table 3.

Comparative example 1 is not encompassed by the invention. It is conducted according to the prior art and reveals by comparison the improvement gained by the technique conforming to the invention.

The results of Table 3 show the improved properties of the syntactic foams prepared according to the invention from resins containing cyclized 1,2-polybutadiene, as compared to a syntactic foam of the prior art, prepared from a resin mainly comprising uncyclized 1,2-polybutadiene diluted with vinyltoluene. The compositions according to the present invention show:

an important decrease of the exotherms when curing the foam;

a substantial reduction of the shrinkage;

an increase in the resistance to breaking when subjected to hydrostatic pressure;

a reduced water absorption.

EXAMPLE 10

A mixture is made with 12 parts by weight of cyclized 1,2 polybutadiene (15–20% 1,2-cyclized, 40–50% 1,2, 15–25% 1,4 trans, 10–20% 1,4 cis, $\overline{M}n=1800$), 36.5 parts by weight of 1,2 polybutadiene (70–75% 1,2, 2–7% 1,4 trans, 15–20% 1,4 cis, $\overline{M}n=2100$), 48.5 parts by weight of tert.butyl styrene, 2 parts by weight of divinylbenzene, 1 part by weight of tris (2-methoxyethoxy) silane, 1 part by weight of tert.butyl perbenzoate and 1 part by weight of dicumyl peroxide. There is then successively added 4 parts by weight of carbon fibers of a length ranging from 1 to 10 mm, then 40 parts by weight of glass microspheres sold by Emerson and Cuming under reference FTD 202, having a diameter from 20 to 200 microns. The mixture is stirred at 38° C. for 30 minutes; it is then degassed under reduced pressure (10 mm Hg) for 1 hour before being poured into the cure mould.

The mould is placed in a ventilated oven heated at 85° C. for 24 hours; the temperature is then increased at a rate of 10° C. per hour up to 140° C., which temperature is maintained for 24 hours. The temperature is then allowed to decrease (20° C. per hour) and the foam is withdrawn from the mould at room temperature. It has a shrinkage of 0.6%, a density of 0.57 g/cm$^3$ and a resistance to hydrostatic pressure higher than 500 bars.

EXAMPLE 11

20 parts by weight of partially cyclized 1,2 polybutadiene and 30 parts by weight of 1,2-polybutadiene, both as defined in example 10, are admixed with 25 parts by weight of vinyltoluene and 25 parts by weight of $\gamma$-methacryloxypropyltrimethoxysilane of the formula $CH_2=C(CH_3)COO(CH_2)_3 Si(OCH_3)_3$. 1 part by weight of lauroyl peroxide is added, followed with 1.5 part by weight of tert.butyl hydroperoxide and 47 parts by weight of glass microspheres FTD-202. After degassing under reduced pressure, the mixture is heat-cured in a mould at 60° C. for 12 hours and 130° C. for 24 hours. The density of the foam obtained in these conditions is 0.53 g/cm³; its resistance to hydrostatic pressure is higher than 440 bars and the water absorption under 200 bars after 900 hours is 0.36%.

TABLE 1

| | UNITS CONTENT (%) | | | |
|---|---|---|---|---|
| | 1,2 cyclized[a] | 1,2 | 1,4 (cis + trans) | $\overline{Mn}$[b] |
| Partially cyclized 1,2 polybutadienes | | | | |
| (A) | 17 | 45 | 38 | 1300 |
| (B) | 25 | 60 | 15 | 1800 |
| (C) | 30 | 45 | 25 | 900 |
| (D) | 41 | 13 | 46 | 5200 |
| 1,2 polybutadienes | | | | |
| (E) | — | 70 | 30 | 1200 |
| (F) | — | 77 | 23 | 2400 |
| (G) | — | 65 | 35 | 15000 |

[a]-determined by Infra-red spectrography and nuclear magnetic resonance.
[b]-determined by tonometry or osmometry.

TABLE 2

| | COMPOSITION IN PARTS BY WEIGHT PER 100 PARTS BY WEIGHT OF RESIN | | | | | | | | |
|---|---|---|---|---|---|---|---|---|---|
| EXAMPLE No. | 1 | 2 | 3 | 4 | 5 | 6 | 7 | 8 | 9 |
| 1,2-cyclized polybutadienes | | | | | | | | | |
| (A) | | 48.5 | | | | | | | 25 |
| (B) | | | 16 | | | 11 | 48 | | |
| (C) | | | | 30 | | | | 35 | |
| (D) | | | | | 1.5 | | | | |
| 1,2 Polybutadienes | | | | | | | | | |
| (E) | 48.5 | | | | 45 | | | 35 | 25 |
| (F) | | | 32.5 | | | 39 | 18 | | |
| (G) | | | | 20 | | | | | |
| Vinyltoluene | 48.5 | 48.5 | 48.5 | 50 | 40 | 50 | 30 | 26 | 47 |
| Trimethylolpropane trimethacrylate | 2 | 2 | 2 | | | | 2 | 2 | 2 |
| Vinyltriethoxysilane | 1 | 1 | 1 | | | | 2 | 2 | 1 |
| Benzoyl peroxide | 1 | 1 | 1 | | 1 | 1 | 1.5 | 1 | |
| Tertiobutyl perbenzoate | | | | 1.5 | | 0.5 | | | 1 |
| Dicumyl peroxyde | 1 | 1 | 1 | 1.5 | 1.5 | 1 | 1.5 | 2 | 1.5 |
| Glass microspheres | 30 | 30 | 32 | 28 | 30 | 30 | 29.5 | 27 | 30 | parts by weight per 100 parts by weight of foam.

TABLE 3

| EXAMPLES No. | STOVE TEMPERATURE (°C.) | TIME (h) | EXOTHERM[a] (°C.) | SHRINKAGE (%) | DENSITY g/cm³ | BREAKING STRENGTH UNDER HYDROSTATIC COMPRESSION (bar) | WATER ABSORPTION AFTER 500h UNDER 200 BAR (%) |
|---|---|---|---|---|---|---|---|
| 1 | 70 | 16 | 42 | 2.2 | 0.55 | 295 | 2.52 |
| | 150 | 24 | 66 | | | | |
| 2 | 70 | 16 | 24 | 0.7 | 0.47 | 325 | 1.67 |
| | 150 | 24 | 15 | | | | |
| 3 | 65 | 16 | 3 | | | | |
| | 90 | 3 | — | 1.5 | 0.52 | 405 | 1.10 |
| | 130 | 21 | 32 | | | | |
| 4 | 90 | 8 | 18 | 0.9 | 0.50 | 420 | 1.33 |
| | 150 | 20 | 15 | | | | |
| 5 | 70 | 20 | 27 | 1.6 | 0.52 | 475 | 0.70 |
| | 130 | 20 | 48 | | | | |
| 6 | 65 | 10 | 7 | 1.0 | 0.53 | 440 | 0.94 |
| | 130 | 20 | 23 | | | | |
| 7 | 80 | 16 | 22 | 0.8 | 0.42 | 390 | 1.13 |
| | 150 | 24 | 34 | | | | |
| 8 | 65 | 16 | 2 | 0.9 | 0.56 | 365 | 2.10 |
| | 130 | 24 | 8 | | | | |
| 9 | 95 | 24 | 13 | 1.1 | 0.49 | 510 | 0.6 |
| | 150 | 20 | 26 | | | | |

[a]-The exotherm is the largest temperature difference between the center of the foam and the stove.

What we claim is:

1. A syntactic foam composition obtained by heat-curing a mixture comprising a resin and inorganic or organic hollow spheres in the presence of at least one free radical generator; said resin consisting essentially of:

(a) 10 to 100% by weight of at least one polybutadiene whose microstructure contains 20–95% of 1,2-units, 5 to 60% thereof being in a carbocyclic cyclized form, the unsaturation remainder being in a cis or trans 1,4 form, and whose number average molecular weight is at most 100,000;

(b) 0 to 90% by weight of at least one polybutadiene whose microstructure contains 40–98% of 1,2-units and 2–60% of cis or trans 1,4 units, and whose number average molecular weight is at most 100,000; and (c) 0 to 90% by weight of at least one liquid vinyl monomer which can polymerize in the presence of free radicals.

2. A composition according to claim 1, wherein said polybutadiene (a) comprises 40 to 85% of 1,2-units, 15–45% of which are in the cyclized 1,2 unit form and 15–60% in the cis or trans 1,4 unit form, has a number average molecular weight of 500 to 30,000 and represents 10 to 60% by weight of the total resin.

3. A composition according to claim 1, wherein said polybutadiene (b) comprises 65 to 80% of 1,2 units and 20 to 35% of cis or trans 1,4 units, has a number average molecular weight of 500 to 30,000 and represents 15 to 70% by weight of the total resin.

4. A composition according to claim 1, wherein said liquid vinyl monomer (c) represents 20 to 60% by weight of the total resin.

5. A composition according to claim 1, wherein the spheres are glass microspheres having a diameter of from 10 to 250 microns, said spheres being incorporated in the mixture in an amount of from 10 to 50 parts by weight per 100 parts by weight of the syntactic foam.

6. A syntactic foam composition according to claim 1 which has a specific weight lower than 0.6 g/cm$^3$ and a resistance to hydrostatic compression higher than 300 bars.

7. A syntactic foam composition according to claim 1, wherein the mixture is heat-cured at a temperature of from 25° to 200° C. in the presence of from 0.2 to 5 weight parts of at least one free radical generator per 100 weight parts of resin.

8. A composition according to claim 7, wherein the curing is effected in two successive stages, the first stage at a temperature of from 45° to 105° C. and the second stage at a temperature of from 120° to 160° C.; and wherein at least two free radical initiators are used, the first being an organic peroxy compound whose 10-hour half-decomposition temperature is 105° C. or lower, and the second being an organic peroxy compound whose 10-hour half-decomposition temperature is higher than 115° C.

9. In an immersible or submersible article comprising a syntactic foam composition, the improvement wherein said syntactic foam composition is a composition obtained by heat-curing a mixture comprising a resin and inorganic or organic hollow spheres in the presence of at least one free radical generator;

said resin consisting of:
- (a) 10 to 100% by weight of at least one polybutadiene whose microstructure contains 20–95% of 1,2-units, 5 to 60% thereof being in a carbocyclic cyclized form, the unsaturation remainder being in a cis or trans 1,4 form, and whose number average molecular weight is at most 100,000;
- (b) 0 to 90% by weight of at least one polybutadiene whose microstructure contains 40–98% of 1,2-units and 2–60% of cis or trans 1,4 units, and whose number average molecular weight is at most 100,000; and
- (c) 0 to 90% by eight of at least one liquid vinyl monomer which can polymerize in the presence of free radicals;

whereby said article has reduced water absorption and increased resistance to hydrostatic pressure.

10. A process according to claim 1, wherein said liquid vinyl monomer (c) is a vinyl hydrocarbon monomer liquid at 40° C.

11. A process according to claim 1, wherein said liquid vinyl monomer (c) is at least one of styrene, ethylstyrene, α-methylstyrene, tert.butylstyrene and vinyltoluene.

* * * * *

UNITED STATES PATENT AND TRADEMARK OFFICE
CERTIFICATE OF CORRECTION

PATENT NO. : 4,255,524

DATED : March 10, 1981

INVENTOR(S) : Francois Dawans et al.

It is certified that error appears in the above—identified patent and that said Letters Patent is hereby corrected as shown below:

COLUMN 8, line 65: reads: "an average molecular weight of 500 to 30,000 and repre-"

should read: --average molecular weight of 500 to 30,000 and repre---.

COLUMN 10, line 19: reads: "(c) 0 to 99% by eight of at least one liquid vinyl"

should read: --(c) 0 to 99% by weight of at least one liquid vinyl--.

Signed and Sealed this

Second Day of June 1981

[SEAL]

Attest:

RENE D. TEGTMEYER

Attesting Officer

Acting Commissioner of Patents and Trademarks